US012296415B2

(12) United States Patent
Roehl et al.

(10) Patent No.: US 12,296,415 B2
(45) Date of Patent: May 13, 2025

(54) METHODS AND SYSTEMS FOR SUPPORT OF LOW-POWER OPERATION IN TRAINING MODES IN WELDING MACHINES

(71) Applicant: Illinois Tool Works Inc., Glenview, IL (US)

(72) Inventors: Chris J. Roehl, Appleton, WI (US); Gregg Prochnow, Hortonville, WI (US); Alan Manthe, New London, WI (US); Maxwell Bode Brock, Appleton, WI (US); Jeremy John Erdmann, Appleton, WI (US); Nicholas James Dessart, Neenah, WI (US); Scott Ryan Rozmarynowski, Greenville, WI (US)

(73) Assignee: ILLINOIS TOOL WORKS INC., Glenview, IL (US)

(*) Notice: Subject to any disclaimer, the term of this patent is extended or adjusted under 35 U.S.C. 154(b) by 801 days.

(21) Appl. No.: 17/511,112

(22) Filed: Oct. 26, 2021

(65) Prior Publication Data
US 2022/0134463 A1    May 5, 2022

Related U.S. Application Data

(60) Provisional application No. 63/107,598, filed on Oct. 30, 2020.

(51) Int. Cl.
*B23K 9/10*    (2006.01)
(52) U.S. Cl.
CPC .................. *B23K 9/1006* (2013.01)

(58) Field of Classification Search
CPC .... B23K 9/1006; B23K 9/167; B23K 9/0953; B23K 3/08; B23K 5/02; B23K 10/00
See application file for complete search history.

(56) References Cited

U.S. PATENT DOCUMENTS

| | | | |
|---|---|---|---|
| 2009/0071949 A1* | 3/2009 | Harris | B23K 9/1006 219/130.1 |
| 2009/0298024 A1* | 12/2009 | Batzler | G09B 5/00 434/234 |
| 2011/0117527 A1* | 5/2011 | Conrardy | B23K 9/291 434/234 |
| 2014/0069900 A1 | 3/2014 | Becker | |
| 2014/0272837 A1 | 9/2014 | Becker | |
| 2015/0190888 A1* | 7/2015 | Becker | G09B 9/00 434/234 |
| 2015/0194073 A1* | 7/2015 | Becker | G05B 15/02 434/234 |
| 2016/0361776 A1* | 12/2016 | Zhang | B23K 9/287 |
| 2017/0046977 A1* | 2/2017 | Becker | G09B 19/003 |
| 2019/0340954 A1* | 11/2019 | Schneider | G09B 19/24 |

OTHER PUBLICATIONS

Extended European Search Report for Application No. 21205580, dated May 6, 2022, 9 pages.

* cited by examiner

*Primary Examiner* — Brian W Jennison
(74) *Attorney, Agent, or Firm* — McAndrews, Held & Malloy, Ltd.

(57) ABSTRACT

Systems and methods are provided for support of low-power operation in training modes in welding machines.

20 Claims, 3 Drawing Sheets

METHODS AND SYSTEMS FOR SUPPORT OF LOW-POWER OPERATION IN TRAINING MODES IN WELDING MACHINES

CLAIM OF PRIORITY

This patent application makes reference to, claims priority to and claims benefit from U.S. Provisional Patent Application Ser. No. 63/107,598, filed on Oct. 30, 2020. The above identified application is hereby incorporated herein by reference in its entirety.

BACKGROUND

Welding has increasingly become ubiquitous. Welding can be performed in an automated manner or in a manual manner (e.g., being performed by a human). Equipment or components used during welding operations may be driven using engines. For example, engines may be used to drive, for example, generators, power sources, etc. used during welding operations.

In some instances, it may be desirable to operate welding-type setups and/or systems in modes that may be different from normal modes of operations, such as for training or demonstration purposes. Operating welding-type setups and/or systems in such non-normal modes of operations may pose some challenges, however. In this regard, conventional approaches for facilitating non-normal modes of operations, if any existed, may be cumbersome, inefficient, and/or costly.

Further limitations and disadvantages of conventional approaches will become apparent to one skilled in the art, through comparison of such approaches with some aspects of the present method and system set forth in the remainder of this disclosure with reference to the drawings.

BRIEF SUMMARY

Aspects of the present disclosure relate to welding solutions. More specifically, various implementations in accordance with the present disclosure are directed to methods and systems for support of low-power operation in training modes in welding machines, substantially as illustrated by or described in connection with at least one of the figures, and as set forth more completely in the claims.

These and other advantages, aspects and novel features of the present disclosure, as well as details of an illustrated implementation thereof, will be more fully understood from the following description and drawings.

DETAILED DESCRIPTION

Figure 1:
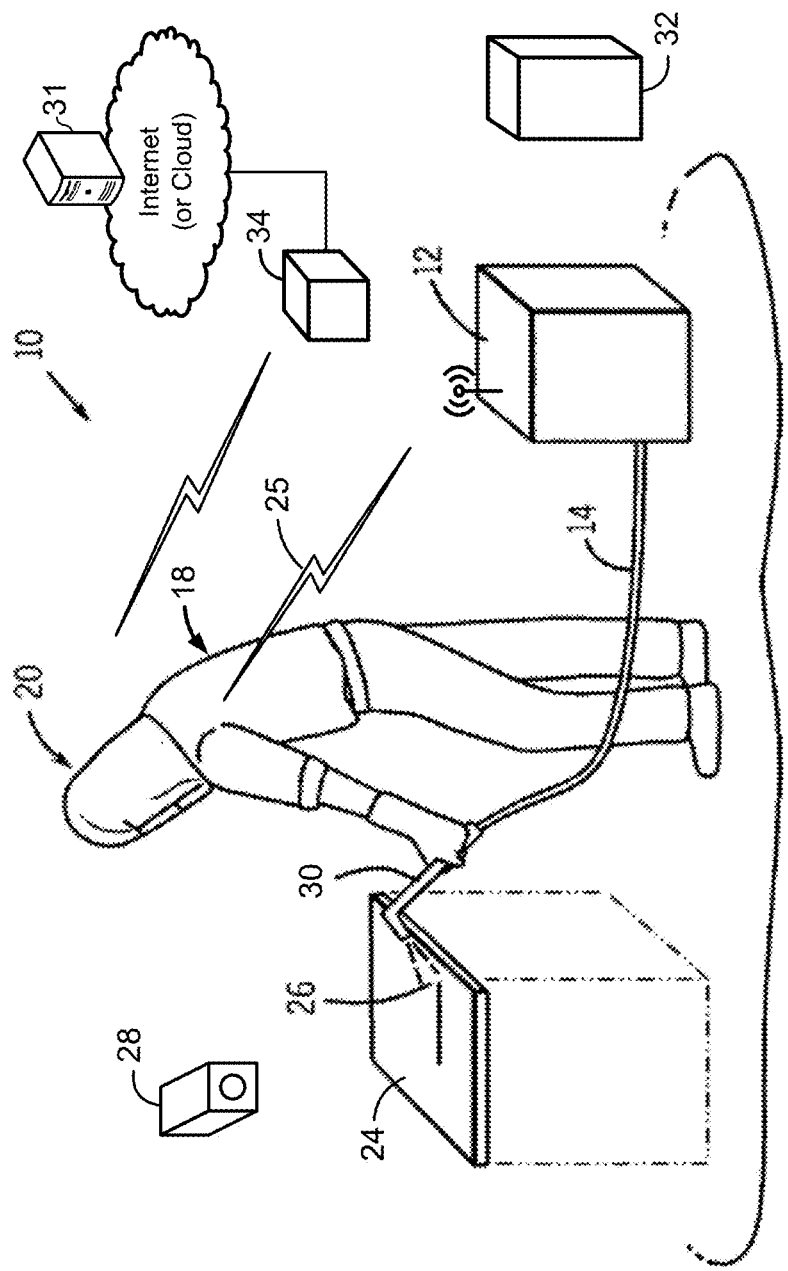
FIG. 1 shows an example setup that may be used for welding-type operations, in accordance with aspects of this disclosure.

As utilized herein, the terms "circuits" and "circuitry" refer to physical electronic components (e.g., hardware), and any software and/or firmware ("code") that may configure the hardware, be executed by the hardware, and/or otherwise be associated with the hardware. As used herein, for example, a particular processor and memory (e.g., a volatile or non-volatile memory device, a general computer-readable medium, etc.) may comprise a first "circuit" when executing a first one or more lines of code and may comprise a second "circuit" when executing a second one or more lines of code. Additionally, a circuit may comprise analog and/or digital circuitry. Such circuitry may operate, for example, on analog and/or digital signals. It should be understood that a circuit may be in a single device or chip, on a single motherboard, in a single chassis, in a plurality of enclosures at a single geographical location, in a plurality of enclosures distributed over a plurality of geographical locations, etc. Similarly, the term "module" may, for example, refer to a physical electronic components (e.g., hardware) and any software and/or firmware ("code") that may configure the hardware, be executed by the hardware, and/or otherwise be associated with the hardware.

As utilized herein, circuitry or module is "operable" to perform a function whenever the circuitry or module comprises the necessary hardware and code (if any is necessary) to perform the function, regardless of whether performance of the function is disabled or not (e.g., by a user-configurable setting, factory trim, etc.).

As utilized herein, "and/or" means any one or more of the items in the list joined by "and/or". As an example, "x and/or y" means any element of the three-element set {(x), (y), (x, y)}. In other words, "x and/or y" means "one or both of x and y." As another example, "x, y, and/or z" means any element of the seven-element set {(x), (y), (z), (x, y), (x, z), (y, z), (x, y, z)}. In other words, "x, y and/or z" means "one or more of x, y, and z." As utilized herein, the term "exemplary" means serving as a non-limiting example, instance, or illustration. As utilized herein, the terms "for example" and "e.g." set off lists of one or more non-limiting examples, instances, or illustrations.

Welding-type power, as used herein, refers to power suitable for welding, plasma cutting, induction heating, CAC-A (carbon arc cutting/air) and/or hot wire welding/preheating (including laser welding and laser cladding). Welding-type power supply, as used herein, refers to a power supply that can provide welding-type power. A welding-type power supply may include power generation components (e.g., engines, generators, etc.) and/or power conversion circuitry to convert primary power (e.g., engine-driven power generation, mains power, etc.) to welding-type power.

Welding-type operations, as used herein, comprise operations in accordance with any known welding technique, including flame welding techniques such as oxy-fuel welding, electric welding techniques such as shielded metal arc welding (e.g., stick welding), metal inert gas welding (MIG), tungsten inert gas welding (TIG), resistance welding, as well as gouging (e.g., carbon arc gouging), cutting (e.g., plasma cutting), brazing, induction heating, soldering, and/or the like.

Welding-type setup, as used herein, refers to any setup comprising welding related devices or equipment (e.g., welding power sources, welding torch, welding gear such as headwear and the like, auxiliary devices or systems, etc.) which are used in facilitating and/or in conjunction with welding-type operations.

FIG. 1 shows an example setup that may be used for welding-type operations, in accordance with aspects of this disclosure.

Referring to FIG. 1, there is shown an example welding-type setup 10 in which an operator 18 is wearing welding headwear 20 and welding a workpiece 24 using a torch 30 to which power is delivered by equipment 12 via a conduit 14, with weld monitoring equipment 28, which may be available for use in monitoring welding operations. The equipment 12 may comprise a power source, optionally a source of a shield gas and, where wire/filler material is to be provided automatically, a wire feeder.

Further, in some instances an engine 32 may be used to drive equipment or components used during welding operations. The engine 32 may comprise a gas engine or a liquefied petroleum (LP) engine. The engine 32 may drive generators, power sources, etc. used during welding operations.

The welding-type setup 10 of FIG. 1 may be configured to form a weld joint by any known welding-type technique. For example, optionally in any implementation, the welding equipment 12 may be arc welding equipment that provides a direct current (DC) or alternating current (AC) to a consumable or non-consumable electrode of a torch 30. The electrode delivers the current to the point of welding on the workpiece 24. In the welding-type setup 10, the operator 18 controls the location and operation of the electrode by manipulating the torch 30 and triggering the starting and stopping of the current flow. In other implementations, a robot or automated fixture may control the position of the electrode and/or may send operating parameters or trigger commands to the welding system. When current is flowing, an arc 26 is developed between the electrode and the workpiece 24. The conduit 14 and the electrode thus deliver current and voltage sufficient to create the electric arc 26 between the electrode and the workpiece. The arc 26 locally melts the workpiece 24 and welding wire or rod supplied to the weld joint (the electrode in the case of a consumable electrode or a separate wire or rod in the case of a non-consumable electrode) at the point of welding between electrode and the workpiece 24, thereby forming a weld joint when the metal cools.

Optionally in any implementation, the weld monitoring equipment 28 may be used to monitor welding operations. The weld monitoring equipment 28 may be used to monitor various aspects of welding operations, particularly in real-time (that is as welding is taking place). For example, the weld monitoring equipment 28 may be operable to monitor arc characteristics such as length, current, voltage, frequency, variation, and instability. Data obtained from the weld monitoring may be used (e.g., by the operator 18 and/or by an automated quality control system) to ensure proper welding.

As shown, the equipment 12 and headwear 20 may communicate via a link 25 via which the headwear 20 may control settings of the equipment 12 and/or the equipment 12 may provide information about its settings to the headwear 20. Although a wireless link is shown, the link may be wireless, wired, or optical.

Optionally in any implementation, equipment or components used during welding operations may be driven using engines. For example, the engine 32 may drive generators, power sources, etc. used during welding operations. In some instances, it may be desired to obtain information relating to used engines. For example, data relating to engines (and operations thereof) used during welding operations may be collected and used (e.g., based on analysis thereof) in monitoring and optimizing operations of these engines. The collection and use of such data may be performed telematically—that is, the data may be collected locally, subjected to at least some processing locally (e.g., formatting, etc.), and then may be communicated to remote management entities (e.g., centralized management locations, engine providers, etc.), using wireless technologies (e.g., cellular, satellite, etc.).

Optionally in any implementation, a dedicated controller (e.g., shown as element 34 in FIG. 1) may be used to control, centralize, and/or optimize data handling operations. The controller 34 may comprise suitable circuitry, hardware, software, or any combination thereof for use in performing various aspects of the engine related data handling operations. For example, the controller 34 may be operable to interface with the engine 32 to obtain data related thereto. The controller 34 may track or obtain welding related data (e.g., from weld monitoring equipment 28, from equipment 12, etc.). The controller 34 may then transmit the data (e.g., both engine related and weld related data), such as to facilitate remote monitoring and/or management, by way of wireless communications. This may be done using cellular and or satellite telematics hardware, for example.

In some example implementations, welding-type systems or setups, such as the welding-type setup 10, may be configured for collecting and reporting data relating to welding-type operations and/or to functions or components utilized during welding-type operations. For example, data from welding processes, power sources, welding-related accessories etc. in a weld setup may be collected. In this regard, the collected data may comprise, for example, current, voltage, wire feed speed, weld states, and numerous other power source parameters and settings.

The collected data may then be sent to remote entities (e.g., a remote server 31, which may be a manufacturer-controlled, Internet-based cloud server) and/or to local systems or devices (e.g., local PC, a tablet, a smartphone, etc.). The collected data may be utilized in enhancing welding-related systems and/or operations. For example, manufacturers may utilize the collected data to identify issues (and correct them) and/or devise modifications or improvements in the various components. Further, users may be able to generate reports on collected data to measure, document, and improve their processes.

In various implementations in accordance with the present disclosure, welding setups or systems (e.g., the welding-type setup 10) may be configured for supporting modes of operations other than normal operation. For example, the welding setup or system may be configured to support training or demonstration modes. In some instances, in such modes only some of the components and/or functions in the welding setup or system may be active and/or used. This may be done, e.g., to avoid having to power on and/or activate all the components and/or functions of the welding setup or system where that may not be necessary—e.g., where only some of the components or functions may be required to support operations in these modes. For example, in training or demonstration modes only user interface (UI) and related components (e.g., circuitry, such as UI board, input and/or output devices, etc.) may be needed for training on and/or demonstrating operations of welding setup or system.

Operation in such modes may pose some challenges, however. For example, in some instances welding setup or system may have power supply requirements associated with normal operation modes that may not be necessary and/or possible when operating in other modes. A welding setup or system may be, for example, configured for utilizing a power supply of specific characteristics (e.g., using 230V power supply) under normal operation modes, but when operating in other modes (e.g., during training, sales/marketing, etc.), the welding setup or system may be located where available input power may have different characteristics (e.g., 115V wall power at location, such as conference/show rooms, where the welding setup or system must be set or used for demonstration/training purposes). Thus, the welding setup or system may need to be configured to facilitate use of the power supply at such location.

For example, with reference to the example use scenario described above, there may be various solutions for powering up 230V welding setup or system without using 230V power. This may be done, for example, by using a transformer with 115V plug on the inlet and a 230V receptacle on the outlet. Such solution may work but may not be desirable, as it may be expensive and an implementation based on it may be cumbersome to move from place to place.

Another approach may be to connect a wall wart and cord (e.g., to the UI) through a micro Universal Serial Bus (USB) receptacle or some other low voltage input connection on the UI board. In this regard, a wall wart may be a power supply configured to accept input power having particular characteristics and provide power output with different characteristics, such as different power level, different type, etc. (e.g., with high voltage input of 100 VAC-240 VAC and low voltage output 5 VDC-20 VDC), and may be plugged into a wall receptacle without the use of an input cord. Such approach may work but may be cumbersome to implement, as it may require the user to, e.g., remove panels from the machine which may be undesirable as it may cause an unsafe situation if not replaced prior to powering up on 230V or greater power and is the most expensive to implement.

Yet another approach may be to use special power adaptors—e.g., a power adaptor that has 115V plug on one end and a 6-50R receptacle or bare wire on the other end. Such approach may also be undesirable, it may not be safe for the general public even though it may be easy to move and connect.

Therefore, solutions that accommodate the different power characteristics (of the system/setup on one side, and the local power supply on the other side), but with no change (or minimal) modifications to the welding setup or system may be more desirable. Thus, the welding setup or system may be configured to support use of any existing port, inlet, or interface for power supply. For example, various welding setup or system incorporate or have USB receptacles (e.g., on the front of the machine), which may be used for such functions as software updates, charging a cell phone to power up the machine, etc.

Accordingly, such USB receptacles, which may already be incorporated or used in the system (e.g., to connect to the system for communicative purposes), may be utilized in some example implementations in supporting use of local power supply sources in certain non-normal modes of operation (e.g., training mode, demonstration modes, etc.). For example, the user may use an USB receptacle in the system, such as by plugging a 115V wall wart into the wall and use a USB Type A to USB Type A (A-to-A USB) cord to connect the wall wart to the machine. It should not be understood, however, that the cord (and the system as a whole) is limited to use of cords with Type A connectors, and/or that the connectors must match. Thus, in some example implementations, cords using connectors of other types (e.g., Type B, Type Mini-A, Type Mini-B, Type Micro-A, Type Micro-B, Type C, etc.) may be used.

Further, the cord or cable used in providing power to the welding-type system need not have connectors of the same types on both ends, and as such in some implementations cords with different types may be used—e.g., Type B to Type A (B-to-A USB) cord, etc. Further, while some of the implementations provided herein are described with respect to USB based interfaces/connectors, the disclosure is not so limited, and other, non-USB based interfaces/ports that may be available and/or supported in the system (e.g., Ethernet, Lighting, FireWire, etc.) may be used based in similar manner. Relatedly, because of the different variations that may be used to supply power in such non-normal modes of operation, the system may be configured to use and/or operate based on different low voltage values when being powered in the manner in non-normal modes of operations (e.g., 3.3V instead of 5V).

Once connected, the user may then activate or turn on a particular non-normal mode (e.g., "Showroom/Demo" mode), such as through the user interface—e.g., by means of a button sequence or navigation to a setting on the front panel. Alternatively, the triggering of and/or transitioning to the non-normal mode may be done automatically, such as based on particular criteria or conditions (e.g., based on plugging something into a USB port in the machine). In some implementations, the interface used in providing power during Showroom/Demo mode (e.g., the USB port of the like) may be configured for multiple use—e.g., for receiving demo mode power and providing other functions, such supporting peripherals. As such the interface may be configurable in various ways—e.g., host power, peripheral power, dual role power in the second link, etc.

The system may be configured for handling particular conditions that may arise from particular power supply conditions associated with such non-normal modes. For example, that system may be configured such that when the non-normal mode (e.g., the showroom mode) is turned on or activated, certain power related errors (e.g., low voltage error due to the main control board trying to power up on the 5V input) may be canceled or ignored. Further, electricity and communication signals may not be allowed to pass to the main control board when the system in such non-normal mode. On the other hand, power and communications signals may be blocked or allowed to bypass the main control board during normal operation.

Such solutions may have various advantages over alterative solutions, as described above. The advantages may include, for example, reducing the need for making changes to the machines (e.g., a machine's service access panels don't have to be removed to connect or access power inputs on the UI board), lower costs given such a solution may be implemented on every machine without a significant expense, safety and ease of connecting to the machine, high mobility, adaptability as it may be applied to any machine sold, etc.

In various implementations, some variations may be incorporated into the solution as described above. For example, in some implementations, a step up transformer with a 115V plug on the inlet and 6-50R receptacle or bare wire connectors on the outlet may be used. In some implementations, 115V wall wart with cord may be used to connect to a power port on the UI board like a micro USB. In some implementations, a wire/cable adapter with 115V plug on one end and 6-50R receptacle or bare wire connectors on the other may be used.

In various implementations, the transition from normal mode of operation to non-normal mode of operation may be done in various ways. For example, in some implementations, the transitioning may be triggered and/or done automatically, such as based on particular criteria or conditions (e.g., based on plugging something into a USB port in the machine). In some implementations, the transitioning may be triggered and/or done manually (e.g., based on user input, such as pressing a button, providing particular command, etc.).

In an example use scenario, when a welding setup or system is connected to a showroom power source (e.g., 115V wall outlet), the welding setup or system may respond by providing corresponding indications and/or messages, such as by displaying via a visual output component (e.g., a flash screen) in the system "Showroom/Training Mode is Active. Remove this power supply before applying input power to welder." If Showroom power and welder input power are applied at the same time, the system may respond by providing corresponding indications and/or messages, such as by displaying on the flash screen "Error Code: Showroom power and welder input power is being applying simultaneously. Remove showroom power and cycle input power to allow welder to function properly." In addition, the flash screen may display an image that appears for a limited amount of time to notify the user of the current state of the machine. The image disappears after a predetermined amount of time—e.g., after 5 seconds.

In some implementations, the welding-type system or setup may incorporate internal/dedicated power sources, which may provide power during welding operation (e.g., generator, power supply (e.g., storage/discharge) devices, etc.). Accordingly, supporting and managing non-normal modes of operations, particularly with respect to managing power supply and requirements thereof associated with such modes, may account for the use of such internal power supply. This may include accounting for supporting such non-normal modes even without requiring making any external connection(s) to the system—e.g., without connecting to any local external power sources where the non-normal modes of operations may be used.

For example, when non-normal modes of operation (e.g., demo/training modes) are triggered, either manually or automatically, operation of the internal power sources may be adjusted to account for the change in power requirement. An internal power supply device (e.g., rechargeable battery), for example, may be adjusted (e.g., by control circuitry in the system) to provide power at different (e.g., lower) voltage, since less components are powered on and/or used in such non-normal modes. Similarly, a generator may be adjusted (e.g., by directly alternating its operation, via existing power conditioning circuitry, etc.) to provide power at different (e.g., lower) voltage. In some instances, the adjusting of operation of the internal power sources may trigger the transition to non-normal modes. For example, when an internal power supply device is used, and the output power thereof is adjusted (e.g., modified to a different (lower) voltage), demo/training mode may be triggered. Similarly, where generator is being used, connecting the system to a local power source (e.g., via USB connector/cord) may trigger transition to demo/training mode.

Figure 2:
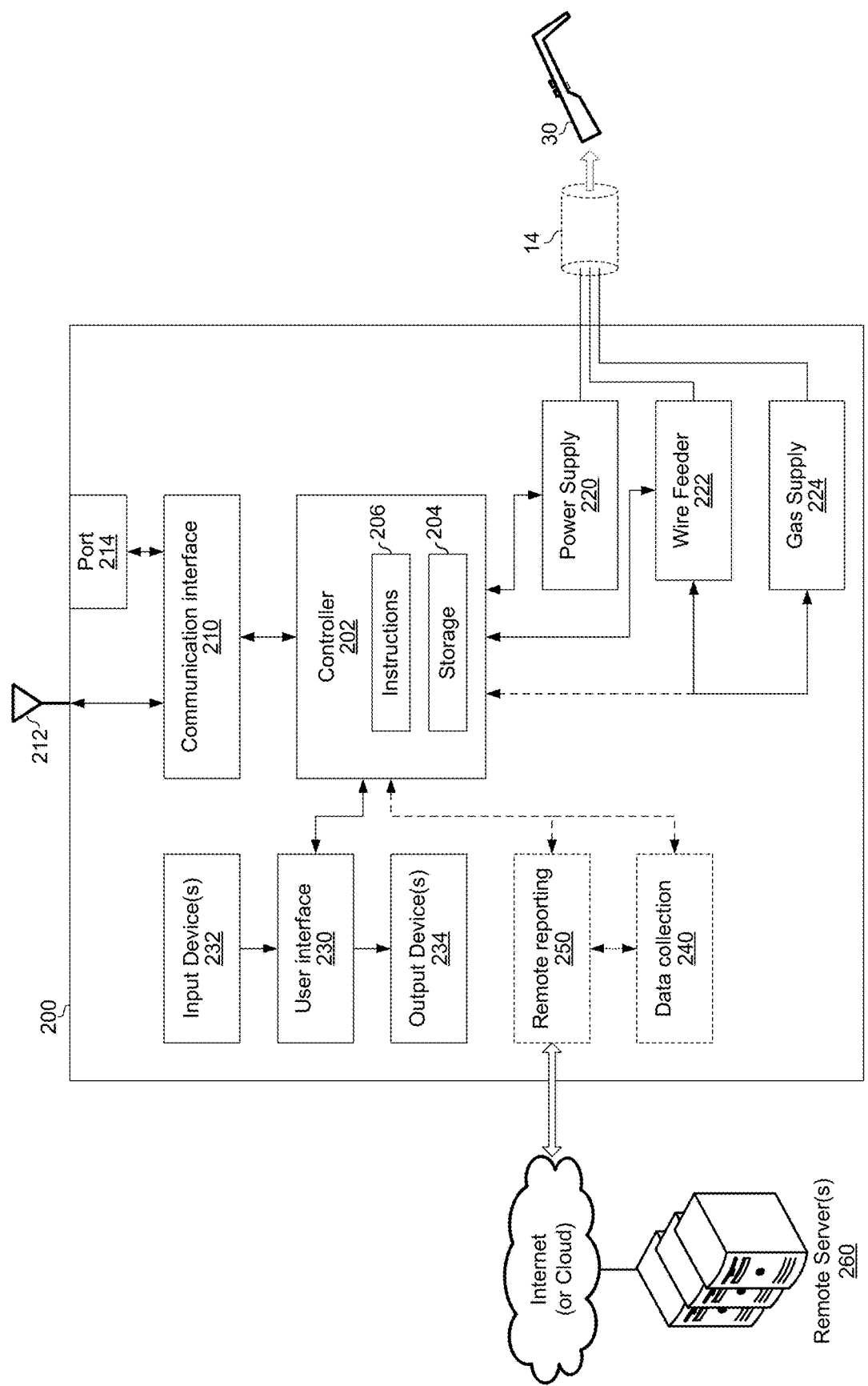
FIG. 2 depicts an example welding-type system that may be used for welding-type operations.

FIG. 2 depicts an example welding-type system that may be used for welding-type operations, in accordance with aspects of this disclosure. Shown in FIG. 2 is an example welding-type system 200.

As shown in FIG. 2, the welding-type system 200 may comprise a controller 202, communication interface module 210, a power supply 220, the wire feeder 222, and/or the gas supply 224, a user interface module 230, a data collection module 240, and a remote reporting module 250.

The controller 202 comprises suitable circuitry (e.g., a microcontroller and memory) for controlling operations of the welding-type system 200 and/or functions associated therewith. For example, the controller 202 may be operable to, for example, process data received from the communication interface module 210, the user interface module 230, the power supply 220, the wire feeder 222, and/or the gas supply 224, generate data and/or control signals for the communication interface module 210, the user interface module 230, the power supply 220, the wire feeder 222, and/or the gas supply 224, etc., and the like.

The controller 202 may comprise digital and/or analog circuitry, discrete or integrated circuitry, microprocessors, digital signal processors (DSPs), field programmable gate arrays (FPGAs), and/or any other type of logic circuits. The controller 202 may be implemented using any combination of software, hardware, and/or firmware. The controller 202 may be configured to execute machine readable instructions 206 that may be stored in storage device(s) 204, which may comprise volatile and/or non-volatile memory, hard drives, solid state storage, and the like.

The communication interface module 210 is operable to interface the control circuitry 202 to an antenna 212 and/or port(s) 214 for transmit and receive operations. For transmit, the communication interface module 210 may receive data from the control circuitry 202 and packetize the data and convert the data to physical layer signals in accordance with applicable protocols (e.g., wireless protocol in use on a wireless communication links, such as the communication link 25 of FIG. 1). For receive, the communication interface module 210 may receive physical layer signals via the antenna 212 or port 214, recover data from the received physical layer signals (demodulate, decode, etc.), and provide the data to control circuitry 202. The antenna 212 may be any type of antenna suited for the frequencies, power levels, etc. The communication port 214 may comprise, for example, an Ethernet over twisted pair port, a USB port, an HDMI port, a passive optical network (PON) port, and/or any other suitable port for interfacing with a wired or optical cable.

The user interface module 230 may comprise electromechanical interface components or devices (e.g., screen, speakers, microphone, buttons, touchscreen, etc.) and associated suitable circuitry for driving, controlling, and utilizing these components or devices. The user interface module 230 may generate electrical signals in response to user input provided via one or more input devices 232 (e.g., screen touches, button presses, voice commands, etc.). Driver circuitry of the user interface module 230 may condition (e.g., amplify, digitize, etc.) the signals and them to the controller 202. The user interface module 230 may generate audible, visual, and/or tactile output (e.g., via speakers, a display, and/or motors/actuators/servos/etc.) which may be provided via one or more output devices 234, in response to signals from the controller 202.

The power supply 220 is configured for providing power within the welding-type system 200 during welding operations. For example, the power supply 220 is configured for delivering power to a welding electrode via conduit 14. The power supply 220 may comprise, for example, one or more voltage regulators, current regulators, inverters, and/or the like. The voltage and/or current output by the power supply 220 may be controlled by a control signal from the controller 202. The power supply 220 may also comprise circuitry for reporting the present current and/or voltage to the controller 202. In an example implementation, the power supply 220 may comprise circuitry for measuring the voltage and/or current on the conduit 14 (at either or both ends of the conduit 14) such that reported voltage and/or current is actual and not simply an expected value based on calibration.

The power supply 220 may be configured for providing power used in the welding-type system 200 during normal welding operations. In this regard, the power supply 220 may operate at particular power (referred to herein as "primary power"). The power supply 220 may also (optionally) perform any necessary power conversions—e.g., via suitable power conversion circuitry, which may be configured to convert the primary power to welding-type power. The primary power may comprise power obtained from various sources, which may be external or internal to the welding-type system 200, or the welding arrangement comprising the welding-type system 200. Example sources of primary power may comprise engine-driven generator(s), dedicated mains/utility power connectors, etc. The primary power may be of various types. For example, the primary power may be direct current (DC) or alternating current (AC) based power. Further, the primary power is not limited to particular value or range of values, may span wide range of values, and may vary between different implementations, such as based on the source (e.g., generator based power vs. utilities based power). For example, the primary power may be 80-660V.

In an example implementation, the power supply 220 may be engine driven. In this regard, the power supply 220 may comprise, for example, an engine, a generator, and power conditioning circuitry. The engine may comprise a gas engine or a liquefied petroleum (LP) engine. The engine may be mechanically coupled or linked to a rotor of the generator. The engine may be controllable to operate at multiple speeds, such as an idle (e.g., no or minimal load speed) and a maximum speed (e.g., the maximum rated power of the engine). The engine speed may be increased and/or decreased, such as based on the load. The generator generates output power based on the mechanical input from the engine. Power conditioning circuitry (not shown) may be used for converting output power from the generator to welding—type power based on a commanded welding-type output. For example, the power conditioning circuitry provides current at a desired voltage to an electrode and a workpiece to perform a welding-type operation. The power conditioning circuitry may comprise, for example, a switched mode power supply or an inverter. The power conditioning circuitry may include a direct connection from a power circuit to the output (such as to the weld studs), and/or an indirect connection through power processing circuitry such as filters, converters, transformers, rectifiers, etc.

The wire feeder 222 is configured to deliver a consumable wire electrode to the weld joint. The wire feeder 222 may comprise, for example, a spool for holding the wire, an actuator for pulling wire off the spool to deliver to the weld joint, and circuitry for controlling the rate at which the actuator delivers the wire. The actuator may be controlled based on a control signal from the controller 202. The wire feeder 222 may also comprise circuitry for reporting the present wire speed and/or amount of wire remaining to the controller 202. In an example implementation, the wire feeder 222 may comprise circuitry and/or mechanical components for measuring the wire speed, such that reported speed is an actual value and not simply an expected value based on calibration.

The gas supply 224 is configured to provide shielding gas via conduit 14 for use during the welding process. The gas supply 224 may comprise an electrically controlled valve for controlling the rate of gas flow. The valve may be controlled by a control signal from the controller 202 (which may be routed through the wire feeder 222 or come directly from the controller 202 as indicated by the dashed line). The gas supply 224 may also comprise circuitry for reporting the present gas flow rate to the controller 202. In an example implementation, the gas supply 224 may comprise circuitry and/or mechanical components for measuring the gas flow rate such that reported flow rate is actual and not simply an expected value based on calibration.

In some implementations, the welding-type system 200 may be configured for optimized and efficient data collection and reporting, in accordance with the present disclosure. In this regard, the welding-type system 200 may incorporate separate data collection and reporting entities, namely the data collection module 240 and the remote reporting module 250, for handling the collection and reporting of data.

The data collection module 240 comprises suitable circuitry for handling collection of data collection within the welding-type system 200. As the data collection module 240 is configured based on the particular architecture of the welding-type system 200. The data collection module 240 may be a dedicated component, or may be implemented using existing circuitry (e.g., as part of the controller 202, the power supply 220, etc.). In this regard, the data collection module 240 may obtained the required data by interacting directly with the various components or devices of the welding-type system 200 (e.g., the power supply 220, etc.), and/or from various sensors (not shown) that the data collection module 240 may be connected to, such as gas/current/voltage sensors, grinders, etc. Alternatively, the data collection module 240 may obtain the data from the controller 202, which typically interacts with all of the components or devices of the welding-type system 200, and as such would be able to handled obtaining the required data.

The remote reporting module 250 comprises suitable circuitry for handling reporting of collected data—that is, providing collected data to remote entities, such as remote server(s) 260. The data may also be reported to other types of systems or devices, which may be tasked with receiving, storing, and utilizing (e.g., analysis and/or making updates based thereon) of reporting data. Examples of such other systems or device may include local PC, a smartphone, a tablet, a plant management system (e.g., a manufacturing execution systems (MES) or an enterprise resource planning (ERP) based system), a robot controller, a programmable logic controller (PLC), a human machine interface (HMI) based device, or other intelligent device.

In various implementations in accordance with the present disclosure, the welding-type system 200 may be configured for supporting modes of operations other than normal operation, such as to support training or demonstration modes of operation, as described above with respect to FIG. 1. In this regard, in such implementations, the welding-type system 200 may be configured such that only some of the components and/or functions in the system may be active and/or used when operating in such modes. For example, in such implementations, when the system transitions to such non-normal modes of operation (e.g., training or demonstration modes), only the controller 202 (or a portion thereof) and the user interface 230 (or a portion thereof), and correspondingly only some of the one or more input devices 232 and the one or more output devices 234 may be powered on and/or activated.

In addition, the welding-type system 200 may be configured for supporting use of power supply sources, during such non-normal modes of operation, which may differ from power supply sources that the system may typically use during normal modes of operation. For example, welding-type system 200 may be configured to support use of 115V power sources (e.g., wall outlets) at locations where non-normal modes of operation (e.g., training, showroom/demonstration, etc.) may be used, whereas the system may typically utilize 230V power during normal mode of operation, as described above.

In this regard, in some instances, the welding-type system 200 may be configured to support use of a USB receptacle, such as using the port 214, for supporting use of local power supply sources in certain non-normal modes of operation (e.g., training mode, demonstration modes, etc.). Thus, along with the controller 202 and the user interface 230 (and related input/output devices), the communication interface 210 (or a portion thereof) and the port 214 may be powered on and/or active when the welding-type system 200 transitions to such non-normal (e.g., training or demonstration) modes of operation.

Accordingly, in an example use scenario, the user may use the USB receptacle (the port 214), such as by plugging a 115V wall wart into the wall and use a USB Type A to USB Type A cord to connect the wall wart to the machine (by inserting the connector into the port 214). Then the user may then activate or turn on a particular non-normal mode (e.g., "Showroom/Demo" mode), such as through the user interface 210, via an available input device 230—e.g., by means of a button sequence or navigation to a setting on a touch screen or keypad. Once powered via port 214, the welding-type system 200 may be configured for handling particular conditions that may arise from particular power supply conditions associated with such non-normal modes, as described above.

Figure 3:
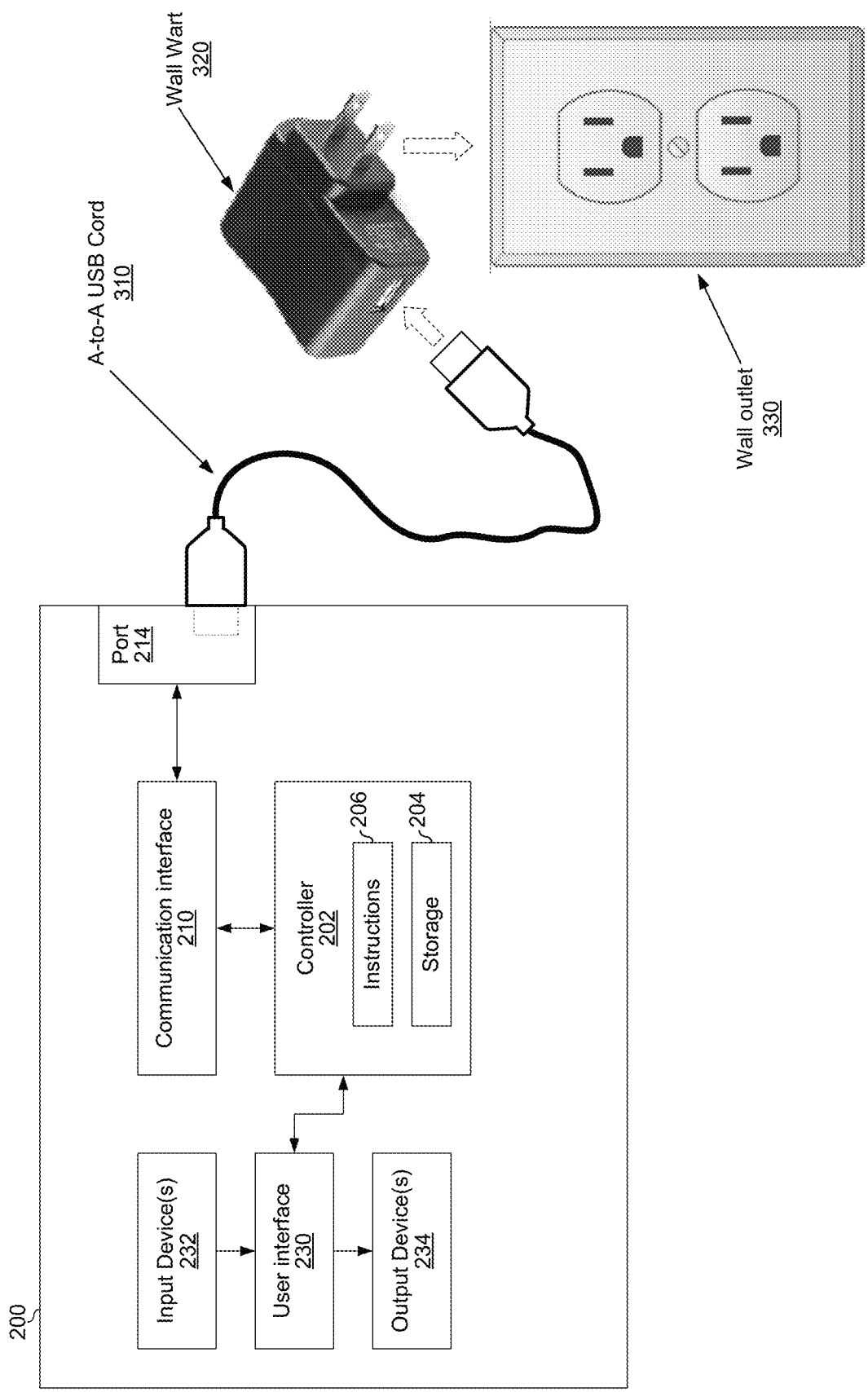
FIG. 3 depicts an example user scenario of a welding-type system that supports non-normal modes of operation.

FIG. 3 depicts an example user scenario of a welding-type system that supports non-normal modes of operation. Shown in FIG. 3 is an example use scenario of a welding-type system that supports non-normal modes of operation (e.g., the welding-type system 200 of FIG. 2). In this regard, the welding-type system 200 may be configured for supporting non-normal modes of operations, and specifically to enable doing so using power conditions different than those needed or used during normal operations, as described above.

For example, this may be done by use of wall wart 320, which may be plugged into a corresponding receptacle in a wall outlet 330, with a Type A to Type A (A-to-A) USB cord 310 being used to connect the wall wart 320 to the welding-type system 200. In this regard, one of the Type A connectors of the A-to-A USB cord 310 may be inserted into or otherwise connected to the port 214 (e.g., via corresponding Type A receptacle) of the welding type 200, for example. The other Type A connector on the other end may then be inserted into or otherwise connected to the wall wart 320 (e.g., via a corresponding Type A receptacle therein). The wall wart 320 is then plugged into the wall outlet 330, which facilitate providing power to the welding-type system 200 via the A-to-A USB cord 310 and the port 214, as described above. In this regard, the wall wart 320 may perform the required changes to the power as it is supplied (e.g., reduce voltage from 115V to 5V, convert from AC to DC, etc.).

An example welding-type system, in accordance with the present disclosure, may comprise a user interface (UI) component configured for providing output to and/or receiving input from a user of the welding-type system, a power supply component configured for providing primary power to the welding-type system during welding operations, from a high-voltage source that provides power at a first voltage level, a receptacle configured for receiving a connector, wherein the connector provides or operates at secondary power that is different from the primary power at least in being at a second voltage level that is lower than the first voltage level, and one or more circuits configured to, in response to the weld-type system transitioning to a training mode: discontinue use of the power supply component, obtain power from the connector, via the receptacle, and drive using the power obtained from the connector, at least one component of the welding-type system during operation in the training mode, the at least one component comprising the user interface (UI) component.

In an example implementation, the one or more circuits are configured to block power and/or signals received from the connector via the receptacle from passing to at least one blocked component of the welding-type system.

In an example implementation, the at least one blocked component comprises a main controller component.

In an example implementation, the one or more circuits are configured to, in response to transitioning to normal operation mode, bypass power and/or signals received from the connector via the receptacle.

In an example implementation, the receptacle is configured for supporting receiving universal serial bus (USB) based connectors.

In an example implementation, the first voltage level is approximately 230V.

In an example implementation, the second voltage level is approximately 5V.

In an example implementation, the connector is configured to obtain power from a demo source.

In an example implementation, the demo source provides power at a third voltage level that is lower than the first voltage level and higher than the second voltage level.

In an example implementation, the first voltage level is approximately 230V and the third voltage level is approximately 115V.

In an example implementation, the connector comprises or is connected to a power conversion component that is configured to convert power supplied from the demo source from the third voltage level to the second voltage level.

In an example implementation, the power conversion component comprises a wall wart plug configured for engaging the demo source.

In an example implementation, the secondary power is different from the power supplied from the demo source in type, and wherein the power conversion component is configured to convert type of power.

In an example implementation, the type of secondary power is direct current (DC) and type of the power supplied from the demo source is alternating current (AC) power, and wherein the power conversion component is configured to convert power from AC power to DC power.

In an example implementation, the one or more circuits are configured to transition the welding-type system to the training mode in response to user input.

In an example implementation, the one or more circuits are configured to transition the welding-type system to the training mode automatically.

In an example implementation, the one or more circuits are configured to transition the welding-type system to the training mode automatically in response to engaging the connector into the receptacle.

Other implementations in accordance with the present disclosure may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the processes as described herein.

Accordingly, various implementations in accordance with the present disclosure may be realized in hardware, software, or a combination of hardware and software. The present disclosure may be realized in a centralized fashion in at least one computing system, or in a distributed fashion where different elements are spread across several interconnected computing systems. Any kind of computing system or other apparatus adapted for carrying out the methods described herein is suited. A typical combination of hardware and software may be a general-purpose computing system with a program or other code that, when being loaded and executed, controls the computing system such that it carries out the methods described herein. Another typical implementation may comprise an application specific integrated circuit or chip.

Various implementations in accordance with the present disclosure may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present disclosure has been described with reference to certain implementations, it will be understood by those skilled in the art that various changes may be made and equivalents may be substituted without departing from the scope of the present disclosure. For example, block and/or components of disclosed examples may be combined, divided, re-arranged, and/or otherwise modified. In addition, many modifications may be made to adapt a particular situation or material to the teachings of the present disclosure without departing from its scope. Therefore, it is intended that the present disclosure not be limited to the particular implementation disclosed, but that the present disclosure will include all implementations falling within the scope of the appended claims.

What is claimed is:

1. A welding-type system, comprising:
   a user interface (UI) component configured for one or both of providing output to a user of the welding-type system and receiving input from the user of the welding-type system;
   a power supply component configured for operating at primary power, for providing power in the welding-type system during welding operations, using a high-voltage source that provides power at a first voltage level;
   a receptacle configured for receiving a connector, wherein the connector provides or operates at secondary power that is different from the primary power at least in being at a second voltage level that is lower than the first voltage level; and
   one or more circuits;
   wherein the weld-type system is configurable to operate in a plurality of modes, the plurality of operating modes comprising, at least, a normal operation mode and a training mode; and
   wherein the one or more circuits are configured to, in response to the weld-type system transitioning to the training mode from another one of the plurality of modes:
      discontinue use of the power supply component;
      obtain power from the connector, via the receptacle; and
      operate, using the power obtained from the connector, at least one component of the welding-type system during operation in the training mode, the at least one component comprising the user interface (UI) component.

2. The welding-type system 1, wherein the one or more circuits are configured to block one or both of power and signals received from the connector via the receptacle from passing to at least one component of the welding-type system.

3. The welding-type system 2, wherein the at least one component comprises a main controller component.

4. The welding-type system 1, wherein the one or more circuits are configured to, in response to transitioning to the normal operation mode, bypass one or both of signals power and signals received from the connector via the receptacle.

5. The welding-type system 1, wherein the receptacle is configured for supporting receiving universal serial bus (USB) based connectors.

6. The welding-type system 1, wherein the first voltage level is approximately 230V.

7. The welding-type system 1, wherein the second voltage level is approximately between 3V-6V.

8. The welding-type system 1, wherein the connector is configured to obtain power from a demo source.

9. The welding-type system 8, wherein the demo source that provides power at a third voltage level that is lower than the first voltage level and higher than the second voltage level.

10. The welding-type system 9, wherein the first voltage level is approximately 230V and the third voltage level is approximately 115V.

11. The welding-type system 9, wherein the connector comprises or is connected to a power conversion component that is configured to convert power supplied from the demo source from the third voltage level to the second voltage level.

12. The welding-type system 11, wherein the power conversion component comprises a wall wart plug configured for engaging the demo source.

13. The welding-type system 11, wherein the secondary power is different from the power supplied from the demo source in type, and wherein the power conversion component is configured to convert type of power.

14. The welding-type system 13, wherein type of secondary power is direct current (DC) and type of the power supplied from the demo source is alternating current (AC) power, and wherein the power conversion component is configured to convert power from AC power to DC power.

15. The welding-type system 1, wherein the one or more circuits are configured to transition the welding-type system to the training mode in response to user input.

16. The welding-type system 1, wherein the one or more circuits are configured to transition the welding-type system to the training mode automatically.

17. The welding-type system 16, wherein the one or more circuits are configured to transition the welding-type system to the training mode automatically in response to engaging the connector into the receptacle.

18. A welding-type system, comprising:
   a user interface (UI) component configured for one or both of providing output to a user of the welding-type system and receiving input from the user of the welding-type system;

a power supply component configured for supplying power within the welding-type system during welding operations based on a first power profile; and one or more circuits;

wherein the welding-type system is configurable to operate in a plurality of modes, the plurality of operating modes comprising, at least, a normal operation mode and a training mode; and wherein the one or more circuits are configured to, in response to the weld-type system transitioning to the training mode from another one of the plurality of modes, adjust operation of the power supply component in accordance with a second power profile, wherein:

the second power profile accounts for requiring less power in the welding-type system than when operating based on the first power profile; and the second power profile allows for operating at least one component of the welding-type system during operation in the training mode, the at least one component comprising the user interface (UI) component.

19. The welding-type system 18, wherein the one or more circuits are configured to, when adjusting the operation of the power supply component, to: shut down the power supply component, disable power supply from the power supply component, or adjust power supply from the power supply component.

20. The welding-type system 18, wherein the one or more circuits are configured to transition the welding-type system to the training mode based on one or more criteria, the one or more criteria comprises connecting the welding-type system to a local external power source that provide power having one or more characteristics different than power supplied based on the first power profile.

* * * * *